Oct. 24, 1961    R. W. BURHANS    3,005,911
GASEOUS MIXTURE ANALYZER
Filed Dec. 17, 1957    2 Sheets-Sheet 2

INVENTOR.
RALPH W. BURHANS
BY
Brumbaugh, Free, Graves & Donohue
his ATTORNEYS.

United States Patent Office 3,005,911
Patented Oct. 24, 1961

3,005,911
GASEOUS MIXTURE ANALYZER
Ralph W. Burhans, Chagrin Falls, Ohio, assignor to The Standard Oil Company, Cleveland, Ohio, a corporation of Ohio
Filed Dec. 17, 1957, Ser. No. 703,440
3 Claims. (Cl. 250—41.9)

This invention relates to analysis of gaseous mixtures and, more particularly, to the use of a system incorporating a mass spectrometer to provide continuous information indicative of the mole percents of constituents of the gaseous mixture.

Mass spectrometers find wide use in the analysis of gaseous mixtures. In particular, such instruments ionize a gaseous mixture, and then record peak values representative of ions contributed by the constituents of the mixture. There are certain instances in which the composition of a gaseous mixture may be determined directly from the recorded peaks, for example when each constituent gas when ionized provides exclusive ions. However, in many applications, several constituents of a mixture under scrutiny may each contribute particular ions so that one peak reading will not be indicative of only a single constituent gas. Whenever the mass spectrometer output may be indicative of more than one of the several constituents of a gaseous mixture, extensive calculations must be undertaken to determine the exact composition of that gaseous mixture.

To overcome the above-outlined difficulties, the present invention provides a system incorporating a mass spectrometer in which several peak values sequentially produced by the mass spectrometer are retained in a memory system and utilized as inputs for a computer. With the computer preset in accordance with certain constants related to the particular constituents that are to be measured, the computer output indicates directly the mole percent of each constituent forming the gaseous mixture.

In a preferred embodiment of the invention, the mass spectrometer peak values are supplied to comparison circuits simultaneously with a potential derived from one of a plurality of adjustable potentiometers, and a servo motor responsive to the output of the comparison circuit adjusts such one potentiometer. The potentiometers, adjusted sequentially to be indicative of the peak values recorded by the mass spectrometer, supply input data to a computer arranged to solve simultaneous equations, and preset with information determined by the constituents of the gaseous mixture. The computer output signals are indicative of the mole percents of the gas constituents, and may be supplied to a recorder.

If desired, the computer output signals may also be utilized to control valves in order to adjust the amount of constituents flowing into the gaseous mixture being measured, thereby to provide for completely automatic control of that gaseous mixture.

These and further advantages of the present invention will be more readily understood when the following description is read in connection with the accompanying drawings, in which.

Figure 1:
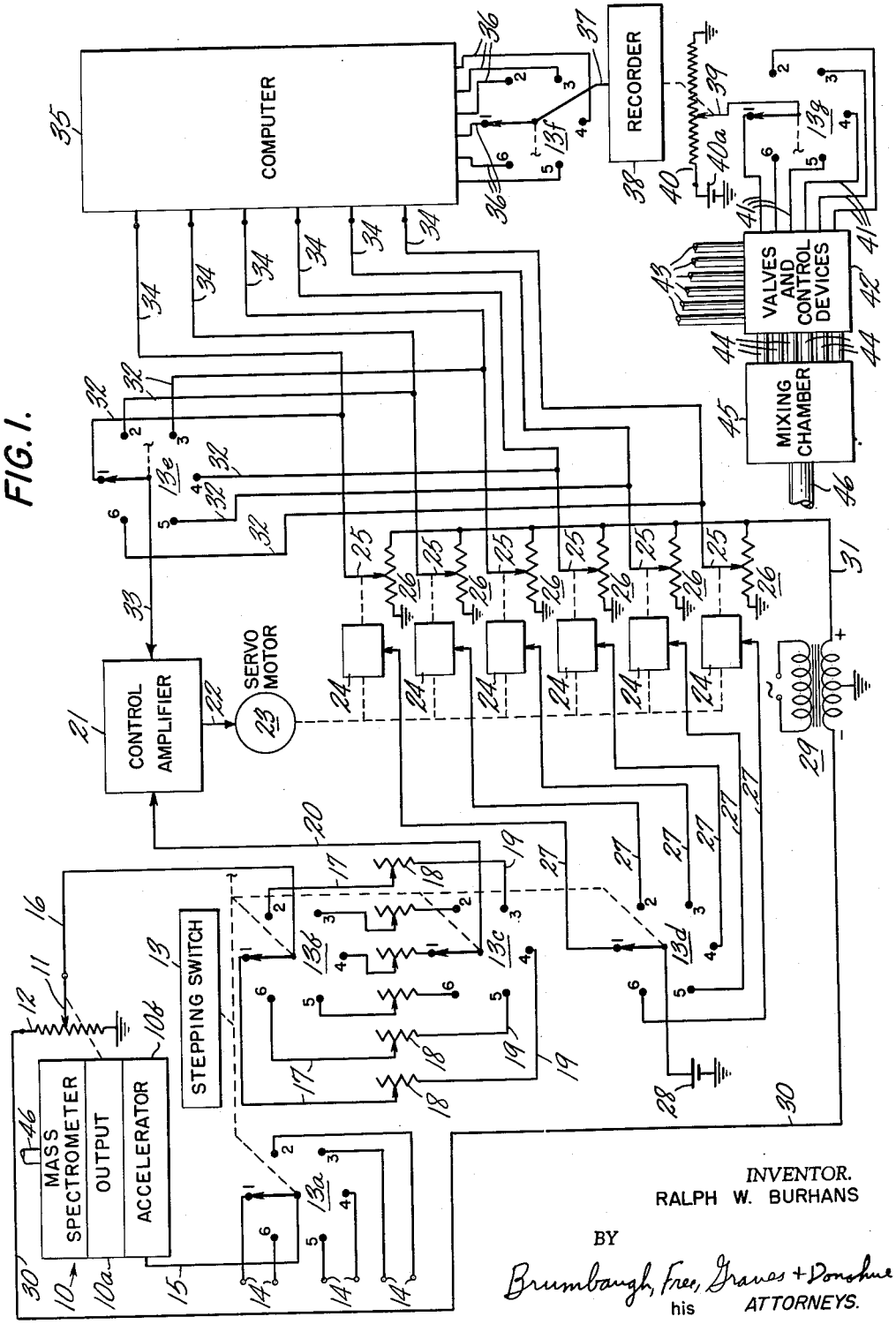
FIGURE 1 is a schematic circuit diagram, partially in block form, illustrating a gas analyzer incorporating a mass spectrometer and control circuits in accordance with the principles of the present invention.

Referring to a typical embodiment of the invention in greater detail with particular reference to FIGURE 1, a conventional mass spectrometer 10 operates to ionize a sample gaseous mixture and provides, through ion collection, peaks or peak signals by appropriate adjustment of its operating characteristics. Such peaks have a value or height the magnitude of which is determined by the number of ions collected which, in turn, is dependent upon the amount of those ions contributed by the constituent gases.

Through its output 10a the mass spectrometer 10 positions a contact arm 11 along a conventional slide wire rheostat 12 as a function of its peak signals. Any known spectrometer may be utilized such, for example, as the units disclosed in U.S. Patents Nos. 2,331,190 and 2,650,306. Moreover, use may be made of a commercial mass spectrometer such as the Beckman RF Gas Analyzer, described in Bulletin 488 dated July 1956, of Beckman Instruments, Inc.

A conventional stepping switch 13 incorporates several banks of contacts respectively designated 13a, 13b, 13c, 13d, 13e, 13f, and 13g. Each of the contact arms of the stepping switch 13 are driven in synchronism in any conventional manner; for example, by a stepping device that permits the switch to rest on each contact for five seconds, or any other suitable time interval. The switch 13 has been illustrated with six contact positions so that up to six different constituents of a gaseous mixture may be explored. Any other number of positions may be used as desired.

In one form of mass spectrometer, peak signals representative of the different ions obtained through ionizing the gaseous mixture are generated by supplying suitable potentials to an accelerator 10b in the spectrometer 10. FIGURE 1 illustrates that arrangement diagrammatically, the switch 13a sequentially coupling one of six different potentials derived from appropriately energized terminals 14 through a conductor 15 to the accelerator 10b. It will be apparent, therefore, that when the arm of the switch 13a rests at position 1, a selected potential will be applied to the accelerator 10b resulting in the collection of desired ions contributed by one or more of the constituents of the gaseous mixture at a collector in the mass spectrometer 10. Accordingly, a peak signal representative of the number of those ions will be generated by the mass spectrometer 10, and output 10a will move the arm 11 along the slide wire rheostat 12 in accordance with such peak.

Signals representative of the mass spectrometer output are transmitted from the wire 12 along a conductor 16 to the arm of the switch 13b, and then through one of a plurality of conductors 17, balancing attenuators 18, and conductors 19 to the switch 13c. A conductor 20 couples the signals indicative of peak values generated by the spectrometer 10 from the switch 13c to a control amplifier 21 having its output applied through a line 22 to a servo motor 23.

Six clutches 24, which may be electromagnetically or electrostatically operated in response to electrical pulses for example, selectively mechanically join the servo motor 23 to movable contact arms 25 of potentiometers 26. Normally, the clutches 24 are not operative to transmit mechanical movement. Upon receipt of pulses sequentially supplied to clutch energizing lines 27 from a potential source 28 and the switch 13d, the clutches 24 mechanically couple the servo motor 23 and the contact arms 25 seriatim.

It is desirable in this embodiment of the invention to energize the slide wire 12 and the potentiometers 26 with out of phase voltages. To this end, a suitably excited transformer 29 is grounded at a center-tap on its secondary winding. Accordingly, voltages supplied to the slide wire 12 and the potentiometers 26 from opposite sides of the secondary winding through conductors 30 and 31, respectively, are 180 degrees out of phase.

A plurality of conductors 32, connecting the potentiometers 26 to the switch 13e, sequentially couple signals through the switch arm and a conductor 33 to a second input of the control amplifier 21. Since the signals furnished to the amplifier 21 on the conductors 20 and 33 are 180 degrees out of phase (being derived from the center-tapped secondary of the transformer 29), when they are equal and applied to a common load, for example, there will be no output on the line 22 to the servo motor 23. However, any inequality in the signals on the lines 20 and 33 will result in an output signal of suitable polarity to drive the servo motor 23 and displace one of the potentiometer arms 25 (depending upon which of the clutches 24 is energized) in a direction to oppose such unbalance until the output of the control amplifier 21 is reduced to substantially zero. It will be evident that with this arrangement, the potentiometers 26 will be adjusted in accordance with a peak signal from the mass spectrometer 10 representative of particular ions contributed by one or more constituents of the gaseous mixture under observation.

The potentiometers 26 are incorporated by conductors 34 into an analog computer 35 to supply input data thereto representative of the peaks derived from the mass spectrometer 10. The analog computer 35 may be one of any number of computers available to solve simultaneous linear algebraic equations, for reasons explained in detail hereinafter. For example, the computers disclosed in U.S. Patents Nos. 2,595,185 and 2,742,227 may be used in the present invention. Other computers available to solve simultaneous equations are discussed in the articles "An Electronic Simultaneous Equation Solver" by Goldberg and Brown, pages 339 to 345 of the Journal of Applied Physics, volume 19, April 1948, and "An Automatic Simultaneous Equation Computer and Its Use in Solving Secular Equations" by Addock, pages 181 to 187 of The Review of Scientific Instruments, volume 19, No. 3, March, 1948. In those computers, any number of unknowns representing the mole percents of the different constituent gases forming the gaseous mixture under observation may be found and output signals proportional to such mole percents provided.

In the described embodiment of the invention, the computer 35 has been illustrated with six inputs and six outputs on lines 36 leading to the switch bank 13f. If desired, the switch 13f may be eliminated and each of the lines 36 connected to an individual recorder to indicate the mole percent of one particular gas found in the gaseous mixture under analysis. However, it is desirable in other instances to use the switch 13f and produce a single output on the arm of the switch 13f which may be coupled through a conductor 37 to a recorder or indicating device 38.

A movable element in the recorder 38 indicating the mole percent of one gas in the mixture under observation may be connected to position a contact arm 39 on a conventional slide wire rheostat 40, energized by a source 40a, to provide an output signal therefrom representative of such one gas in the gaseous combination. The output signal is coupled through switch 13g and conductors 41 to valves and control devices 42.

The constituent gases may flow into the valves 42 through pipes 43 and exit through pipes 44 to a mixing chamber 45, the resulting gaseous mixture being discharged in the pipe 46. Any conventional arrangement may be used to control the incoming flow of constituent gases in the pipes 43 so long as each of the valves is adjusted to provide flow therethrough in accordance with corresponding signals transmitted from the slide wire 40.

It will be evident that with the above-described arrangement, automatic control of a gaseous mixture may be achieved. Thus, as soon as the information supplied to the computer 35 results in an output signal indicative of a higher mole percent of one gas than desired, the valves and control devices 42 will respond to such signal to adjust a valve and decrease the amount of that gas introduced into the gaseous mixture discharged into pipe 46.

Considering a typical operation of the above-described embodiment of the invention, it will be understood that only in isolated cases will a peak signal obtained from the mass spectrometer 10 be determined by one constituent gas in a gaseous mixture. In other words, if three gases found in the mixture each provide exclusive ions when ionized in the mass spectrometer 10, the composition of the gaseous mixture may be determined directly from the peak signals. In many instances, however, two or more gases in a gaseous mixture will provide the same ions upon ionization each of which contributes to a single peak signal. For example, $CO_2$ gas and $CH_4$ gas both produce $C^+$ ions upon ionization and the contribution of such ions in the mixture spectra is a function of the sum of the individual fragmentation pattern of each gas separately. When that is true, simultaneous equations must be solved to determine the exact composition of a gaseous mixture formed of several different gases.

Assuming that it is necessary to determine the mole percents of three constituent gases, three simultaneous equations may be written as follows:

(1) $\quad a_{11}x_1 + a_{12}x_2 + a_{13}x_3 = h_1$
(2) $\quad a_{21}x_1 + a_{22}x_2 + a_{23}x_3 = h_2$
(3) $\quad a_{31}x_1 + a_{32}x_2 + a_{33}x_3 = h_3$ With reference to Equations 1, 2 and 3. Each of the constants $h$ represents a quantity proportional to a peak signal derived from the mass spectrometer; the variables $x$ are the unknown mole percents of the three constituents of the gaseous mixture; and the $a$ coefficients are numbers proportional to the peak sensitivities of the pure gas constituents at the peaks selected for the gas analysis. It will be evident that an analog computer arranged to solve simultaneous equations, and initially set-up with the applicable $a$ coefficients, will furnish output signals indicative of $x_1$, $x_2$ and $x_3$ when the quantities $h_1$, $h_2$ and $h_3$ are supplied thereto.

Figure 3:
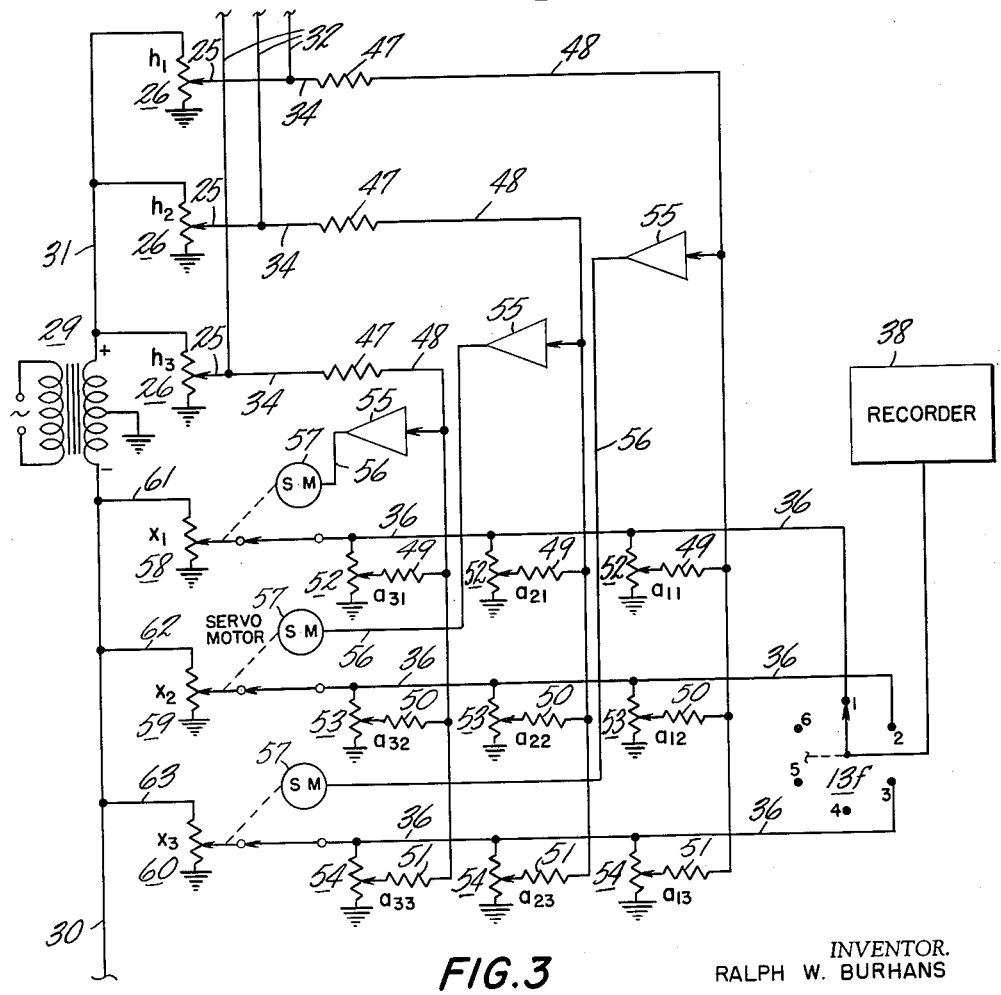
FIGURE 3 is a schematic circuit diagram of a computer that may be incorporated in the analyzer shown in FIGURE 1.

For example, a computer shown in FIGURE 3 may be used to solve three simultaneous equations. In particular, potentials from the potentiometers 26, representative of $h_1$, $h_2$ and $h_3$, are coupled through three channels, each including a resistor 47, conductor 48, and resistors 49, 50 and 51, to potentiometers 52, 53 and 54, respectively, preset to represent the coefficients $a_{11}$, $a_{12}$, $a_{13}$; $a_{21}$, $a_{22}$, $a_{23}$; and $a_{31}$, $a_{32}$ and $a_{23}$, respectively, in the Equations 1, 2 and 3, set forth above.

In each of the three channels, an amplifier 55 and a conductor 56 couple the conductor 48 to a servo motor 57. Potentiometers 58, 59, 60, respectively representative of the variables $x_1$, $x_2$ and $x_3$, are driven by the servo motors 57. Conductors 61, 62 and 63 are connected to the conductor 30 to energize the potentiometers 58, 59

60, respectively, the contact arms of which are joined to the output conductors 36. The preset potentiometers 52, 53 and 54 also are connected to the output conductors 36.

With the foregoing arrangement, it is apparent that the servo motors 57 will position the potentiometers 58, 59 and 60 in accordance with the solution to the simultaneous Equations 1, 2 and 3, and output signals representative of $x_1$, $x_2$ and $x_3$ will be supplied to the output conductors 36 and the switch 13f, and then to the recorder 38, as described above.

Returning to the circuit of FIGURE 1, with the stepping switch 13 as position 1, a selected voltage impressed on the mass spectrometer accelerator 10b results in a peak reading representative of certain ions contributed by one or more constituents in the gaseous mixture under scrutiny in the pipe 46. If such peak reading differs in value from that obtained in the previous operating cycle, the voltages supplied to the control amplifier 21 on the lines 20 and 33 will differ, and the servo motor 23 will be energized through the line 22 by the resulting output signal.

The switch 13d is also at position 1 so that the corresponding clutch 24 is excited and the arm 25 on the upper potentiometer 26 driven in a direction to diminish the voltage differences at the inputs to the amplifier 21 until its output is zero. At that time, the potentiometer 26 will be adjusted in accordance with the peak signal, and will supply input data representative of such peak to the computer 35.

Assuming that the peak reading is somewhat higher than in the previous cycle, the computer 35 will solve the new set of equations and supply an output signal on one of the lines 36 representative of the value of $x_1$, which may be the same, but which will be greater if the assumption is made that the mole percent of the first gas in the mixture has increased. With the signal on the line 36 greater in magnitude than the signal on that line in the previous cycle, due to a mole percent increase of the first gas, the recorder 38 will be actuated to drive the slide wire arm 39 along the slide wire 40 to increase the signal on the line 41. Accordingly, the valve controlling the first gas in one of the pipes 43 will be adjusted to reduce the amount of the first gas flowing through one of the pipes 44 into the mixing chamber 45, and then into the gaseous mixture under observation.

After the stepping switch 13 has rested in its first position for a selected interval, for example five seconds, it will step to its second position to provide a different potential on the mass spectrometer accelerator 10b. Accordingly, another peak reading will be derived from the mass spectrometer representative of other ions contributed by one or more of the constituents of the gaseous mixture. It should be noted that the response of the mass spectrometer output 10a and the slide wire arm 11 is sufficiently rapid to preclude undue movement of the servo motor 23 during switching periods. For example, if the switch arm of the switch 13d energized the second clutch 24 before the peak reading is indicated by the position of the arm 11 on the slide wire 12, the servo motor 23 might drive the corresponding potentiometer arm 25 a substantial distance back and forth as the arm 11 is moved into position. If this problem occurs, it may be readily overcome, for example, by utilizing a fast opening and slow closing switch 13d, synchronized with the other switches; disposing gates in the lines 27 open during switching intervals; or by inserting a gate in the line 22 open during switching intervals to preclude operation of the servo motor.

Figure 2:
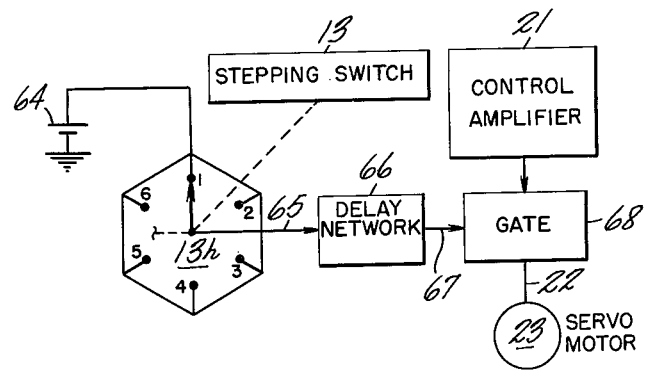
FIGURE 2 is a schematic circuit diagram, partially in block form, of a feature that may be added to the circuits of FIGURE 1.

Describing one such arrangement in greater detail, with reference to FIGURE 2, the stepping switch 13 drives another switch bank 13h having all six of its contacts energized by a potential source 64. A conductor 65 from the contact arm of the switch 13h leads to a delay network 66 whose output signals on a line 67 opens a gate 68 to permit current to flow in the line 22 between the control amplifier 21 and the servo motor 23. With that arrangement, initial movement of the stepping switch removes potential from the conductor 67 to close the gate 68 and deenergize the servo motor 23 during a switching interval. After the respective switch arms reach the following contacts, the delay network 66 prevents the application of opening potential to the gate 68 for a selected interval during which the arm 11 is adjusted to a position on the slide wire 12 indicative of another peak value.

Returning to the operation of the circuits of FIGURE 1, after resting for five seconds at position 2, the stepping switch 13 advances to position 3 to derive a peak reading representative of still other ions contributed by one or more of the constituent gases from the mass spectrometer 10. After remaining at position 3 for five seconds, the stepping switch 13 may be stepped rapidly through its remaining positions to position 1 to commence another cycle of operation, in the event only the mole percents of three constituent gases are required. Of course, any greater or lesser number of positions may be used, depending upon the nature of the gaseous mixture that must be analyzed.

If desired, signals may be derived directly from the ion collector in the mass spectrometer 10 to eliminate the transmitting slide wire 12. With that arrangement, suitable operating potentials may be applied to the potentiometers 26, and the attenuators 18 adjusted to balance the inputs to the control amplifier 21. With D.-C. signals involved, the control amplifier may take the form of a differential amplifier providing zero output when signals of equal amplitude are received on the input lines 20 and 33, and supplying outputs of a magnitude and polarity determined by the differences between such signals at other times, and the sense of such differences.

It will be understood that the above-described embodiments of the invention are illustrative only and modifications thereof will occur to those skilled in the art. Therefore, the invention is not to be limited to the above-described apparatus but is to be defined by the appended claims.

I claim:
1. In a gaseous mixture analyzer of the type employing mass spectrometer means generating a plurality of signals seriatim each of which is a function of a like plurality of constituents of the gas, means responsive to said signals to provide constant outputs of amplitudes representative of said signals, and computer means responsive to said outputs to provide a like plurality of output signals respectively indicative of the amount of each constituent, the combination which comprises a stepping switch with a plurality of connections, successively made for successively conditioning the spectrometer to sensitivity to a different constituent, a plurality of contacts for successively rendering the computer responsive to spectrometer signals corresponding to such different constituents, servo means for adjusting computer inputs to correspond to spectrometer signals, a gate normally closed having an input connection, the gate being openable in response to energization of such input connection to energize the servo means, said stepping switch also having a plurality of switch contacts successively connectable to said gate input connection for opening the gate upon conditioning the spectrometer for a given constituent and rendering the computer responsive to spectrometer signals corresponding to the same constituent, and delay means interposed in the input connection to said gate for avoiding movement of the servo means during switching periods between conditioning to successive gas constituents.

2. In combination, an indicating device, a stepping switch having a plurality of contacts connected to said indicating device in succession for rendering it responsive to a plurality of different quantities in succession, a plurality of potentiometers having sliding taps for storing values in the form of potentiometer voltages corresponding to indications of different quantities of said indicating device, a control amplifier for comparing output signals of the indicating device with the voltages of said potentiometers, contacts on the stepping switch for successively connecting the indicating device output to the potentiometer corresponding to the quantity to be indicated in synchronism with the stepping switch contacts controlling the indicating device, said control amplifier producing an output current in response to imbalance of voltages compared thereby, a servo motor for adjusting the settings of the potentiometers having an input line energized by the output of the control amplifier, a gate interposed in said input line to the servo motor having an input control line, the gate being openable in response to actuation of the gate input control line, the stepping switch having an additional set of contacts successively connected to said input control line of the gate for actuating it and a delay network interposed in the gate input control line for avoiding movement of the servo motor during switching periods of the stepping switch between rendering the indicating device responsive to different quantities to be indicated.

3. Apparatus as in claim 2 wherein stepping switch contacts are employed of the fast opening slow closing type which are synchronized with the other stepping switch contacts for rendering the potentiometer taps responsive successively to operation of the servo motor.

References Cited in the file of this patent
UNITED STATES PATENTS

| | | |
|---|---|---|
| 2,792,501 | Barton | May 14, 1957 |
| 2,817,691 | Hutchins | Dec. 24, 1957 |
| 2,883,343 | Favre | Apr. 21, 1959 |
| 2,905,821 | Younkin | Sept. 22, 1959 |
| 2,911,146 | Lanneau | Nov. 3, 1959 |

OTHER REFERENCES

Berry et al.: A Computer for Solving Linear Simultaneous Equations, Journal of Applied Physics, vol. 17, No. 4, April 1946, pp. 262–272.